F. G. HOBART.
PISTON PIN LOCKING MECHANISM.
APPLICATION FILED DEC. 27, 1915.
1,211,582.
Patented Jan. 9, 1917.
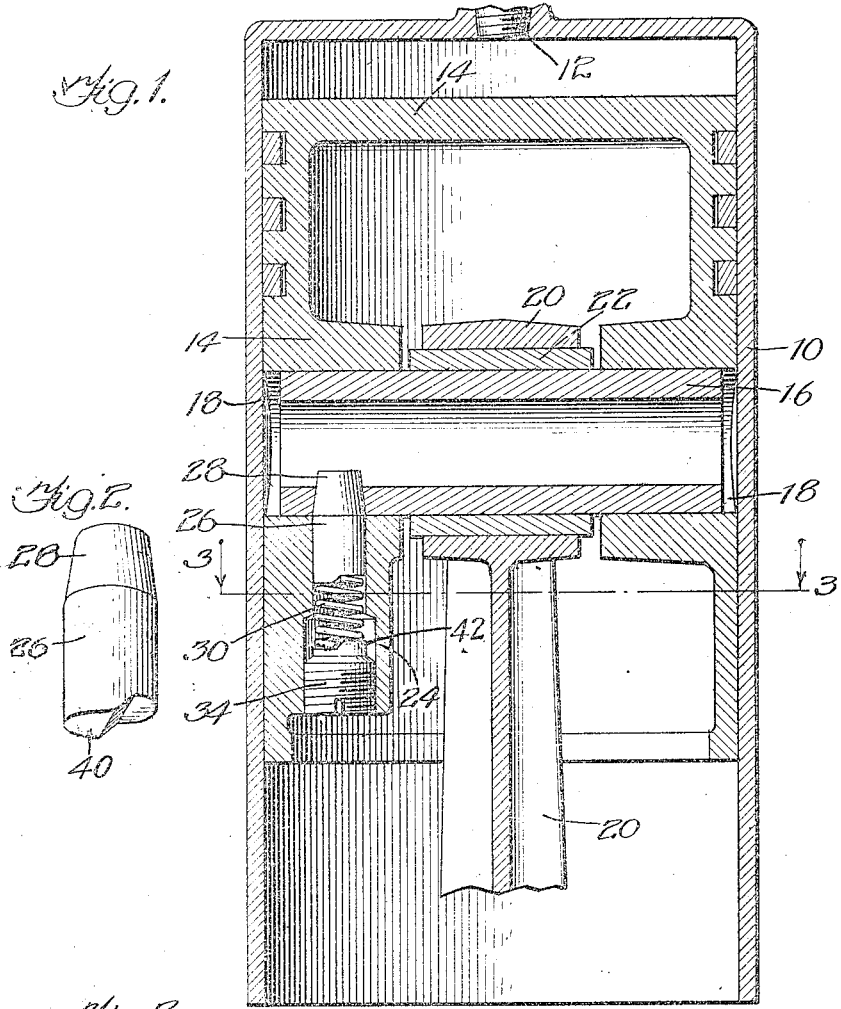
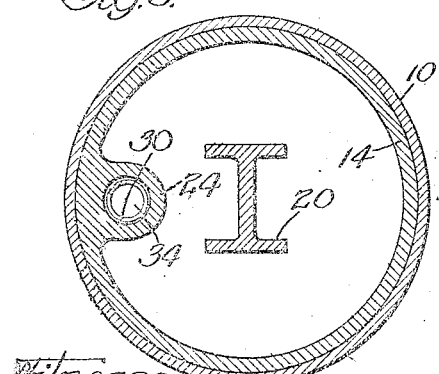

UNITED STATES PATENT OFFICE.

FRANKLIN G. HOBART, OF BELOIT, WISCONSIN, ASSIGNOR TO FAIRBANKS, MORSE & CO., OF CHICAGO, ILLINOIS, A CORPORATION OF ILLINOIS.

PISTON-PIN-LOCKING MECHANISM.

1,211,582.　　　　Specification of Letters Patent.　　　Patented Jan. 9, 1917.

Application filed December 27, 1915. Serial No. 68,642.

*To all whom it may concern:*

Be it known that I, FRANKLIN G. HOBART, a citizen of the United States, residing at Beloit, in the county of Rock and State of Wisconsin, have invented a certain new and useful Improvement in Piston-Pin-Locking Mechanism, of which the following is a specification.

This invention relates to pistons of engines of any sort.

The object of the invention is to provide a device for detachably connecting the piston pin carrying the piston or connecting rod to the piston itself in such a manner that it is detachably removable, yet normally tight and noiseless.

The invention consists in a device capable of carrying out the foregoing objects; which can be easily and conveniently made and installed; which is satisfactory in operation, and not readily liable to get out of order.

It further consists in the features and details of construction which will be hereafter more fully set forth in the specification and claim.

Referring to the drawings, in which similar numerals indicate the same parts throughout the several views, Figure 1 is a central sectional detail view of the cylinder of a gas engine, one of the many types of engines to which the device of this invention may be applied, showing mechanism illustrating this invention in its preferred form. Fig. 2 is a detail view of a locking pin. Fig. 3 is a sectional plan view of the cylinder taken on approximately the line 3—3 of Fig. 1, the piston rod being removed.

In Fig. 1 a conventional form of a gas engine cylinder 10, open at its bottom and equipped at its upper end with a spark plug 12, is shown. Slidable vertically in this cylinder 10 is a piston 14 of the so-called trunk form of commerce, having extending transversely of it the hollow piston pin 16, the same being normally before the device of this invention is applied, slidable and rotatable in the cylindrical opening 18 formed transversely of the piston. The piston or connecting rod 20 is attached to the pin 16 by inclosing it over the washer 22 in the ordinary manner.

In order to prevent the normally more or less loose pin 16 from rattling in the piston 14, a suitable boss or lug 24 is provided at any convenient point on the inside of the piston 14 which is accessible from the open end of the piston and from the open end of the cylinder, and in a suitable opening provided in this boss or lug 24 there is inserted a dowel pin 26 preferably with a tapered end 28 entering a suitable opening provided for it in the piston pin 16, this dowel pin 26 being pressed into position by a spring member 30 detachably held in place by any suitable means, such as a screw 34.

Spring 30 is arranged to produce a constant pressure between the dowel pin 26 and the screw 34, thereby preventing any tendency of the dowel pin to loosen under the vibratory action of the engine, while at the same time it is possible to, at the will of the operator, remove this screw when it is desired to disassemble the parts. Obviously, by moving the screw in or out the operator adjusts the tension of the spring and consequently regulates the action of the dowel pin. The tapering of the dowel pin 26 makes it take a positive hold of the piston pin 16, thereby securing it in rigid position in all directions, thereby preventing all rattling of the pin with reference to the piston.

The end of the dowel pin 26 which engages the spring, the lower end as shown in Fig. 2, is provided with any suitable irregular or roughened form 40, as shown in Fig. 1, and the spring contacting end of the screw 34 is provided with a corresponding roughened surface 42 adapted to be engaged by the end of the spring; this so that the dowel pin, spring and screw are sufficiently interlocked together to prevent the screw 34 working loose and out of position under ordinary jarring of the machinery while, as a substantial force is applied by means of a screw driver, the screw may be rotated in either direction notwithstanding this special construction.

Having thus described my invention, what I claim as new and desire to secure by Letters Patent, is:—

A trunk piston or crosshead having an inserted pin for connecting rod attachment, a dowel carried by the crosshead and engaging said pin, a spring urging said dowel against said pin and a screw plug acting against said spring, said plug and dowel being shaped where they make contact with this spring so that the tension of the spring will tend to prevent the plug from unscrewing even though it may be quite loose in the threads.

In witness whereof, I have hereunto subscribed my name in the presence of two witnesses.

FRANKLIN G. HOBART.

Witnesses:
 GEO. B. INGERSOLL,
 FLORA A. CONANT.